United States Patent [19]
Li et al.

[11] Patent Number: 5,897,929
[45] Date of Patent: Apr. 20, 1999

[54] POLYAMIDE COATED AIRBAG FABRIC

[75] Inventors: Shu Long Li; Robert C. Arnott, both of Spartanburg, S.C.; Ramesh Keshavaraj, Lagrange, Ga.

[73] Assignee: Milliken & Company, Spartanburg, S.C.

[21] Appl. No.: 08/980,926

[22] Filed: Dec. 1, 1997

[51] Int. Cl.$^6$ .................................................. B29D 22/00
[52] U.S. Cl. ..................... 428/36.1; 280/728.1; 442/168; 442/226
[58] Field of Search .............................. 428/36.1; 442/65, 442/168, 226; 280/728.1

[56] References Cited

U.S. PATENT DOCUMENTS

| | | | |
|---|---|---|---|
| 3,705,645 | 12/1972 | Konen | 206/46 |
| 3,871,946 | 3/1975 | Romanski et al. | 161/88 |
| 4,217,256 | 8/1980 | Peerman et al. | 260/18 |
| 4,433,493 | 2/1984 | Poisson | 34/116 |
| 4,921,735 | 5/1990 | Bloch | 428/34.9 |
| 4,977,016 | 12/1990 | Thornton et al. | 428/225 |
| 4,994,225 | 2/1991 | Davis | 264/257 |
| 5,073,418 | 12/1991 | Thornton et al. | 428/34.9 |
| 5,110,666 | 5/1992 | Menzel et al. | 428/196 |
| 5,114,180 | 5/1992 | Kami et al. | 280/743 |
| 5,208,097 | 5/1993 | Honma et al. | 428/226 |
| 5,399,402 | 3/1995 | Inoue et al. | 428/35.7 |
| 5,421,378 | 6/1995 | Bowers et al. | 139/435.1 |
| 5,503,197 | 4/1996 | Bower et al. | 139/435.1 |
| 5,529,837 | 6/1996 | Fujiki et al. | 428/266 |
| 5,593,941 | 1/1997 | Kato et al. | 503/227 |

FOREIGN PATENT DOCUMENTS 6-16100   1/1994   Japan .

*Primary Examiner*—James J. Bell
*Attorney, Agent, or Firm*—Terry T. Moyer; James M. Robertson

[57] ABSTRACT

A coated base fabric for use in an automotive airbag is provided. The coated base fabric includes a substrate of woven nylon or polyester which is overcoated with a porosity blocking layer of polyamide material. The porosity blocking layer of polyamide material is present at a level of about 0.6 ounces per square yard or less. A method for producing the coated fabric of the present invention is also provided.

8 Claims, No Drawings

POLYAMIDE COATED AIRBAG FABRIC

FIELD OF THE INVENTION

This invention relates generally to coated fabrics and more particularly concerns fabrics for use in automotive restraint cushions which have low permeability, yet avoid the use of heavy coatings such as neoprene, silicones and the like, which have historically been used. More specifically, the present invention relates to a coated airbag fabric, which includes a very light coating of water-dispersed finely divided polyamide material. The polyamide coating is applied across one or both sides of a nylon or polyester substrate fabric at dry coating weights of about 0.6 ounces or less per square yard.

BACKGROUND AND SUMMARY

Airbags for motor vehicles are known and have been used for a substantial period of time. A typical construction material for airbags has been a polyester or nylon fabric, coated with an elastomer such as neoprene, or silicone. The fabric used in such bags is typically a woven fabric formed from synthetic yarn by weaving practices which are well known in the art.

The coated material has found acceptance because it acts as an impermeable barrier to the inflation medium. This inflation medium is generally a nitrogen gas generated from a gas generator or inflator. Such gas is conveyed into the cushion at a relatively warm temperature. The coating obstructs the permeation of the fabric by such hot gas, thereby permitting the cushion to rapidly inflate without undue decompression during a collision event.

Airbags may also be formed from uncoated fabric which has been woven in a manner that creates a product possessing low permeability or from fabric that has undergone treatment such as calendering to reduce permeability. Fabrics which reduce air permeability by calendering or other mechanical treatments after weaving are disclosed in U.S. Pat. No. 4,921,735; U.S. Pat. No. 4,977,016; and U.S. Pat. No. 5,073,418 (all incorporated herein by reference).

The coating of a fabric with an elastomer such as neoprene typically requires the application of that elastomer from a solution in a volatile solvent. This solvent must then be evaporated and the elastomeric system cured. Typical dry coating weights for neoprene have been in the range of about 1 ounce per square yard or greater. Silicone coatings typically utilize either solvent based or complex two component point of application reaction systems. Dry coating weights for silicone have been in the range of about 0.7 ounces per square yard or greater. As will be appreciated, high add on weights substantially increase the cost of the base fabric for the airbag as well as making the eventual sewing of the fabric into an airbag structure more difficult.

The use of certain polyurethanes as coatings as disclosed in U.S. Pat. No. 5,110,666 to Menzel et al. (incorporated by reference) permits low add on weights reported to be in the range of 0.1 to 1 ounces per square yard but the material itself is relatively expensive and is believed to require relatively complex compounding and application procedures due to the nature of the coating materials. It will, of course, be readily appreciated that complex solvent-based curing systems generally add expense to the process due to the need to closely control the curing operation.

In light of the background above, it can be readily seen that there exists a need for an airbag base fabric which provides controlled low permeability through use of a coating which provides an effective barrier to air permeability while nonetheless avoiding the inherent complexity and cost of materials which have heretofor been utilized. The present invention is believed to address these and other needs through use of a coating in the form of a water borne dispersion of finely divided polyamide which can be effectively applied at dry coating weights of about 0.6 ounces per square yard or less across a polyester or nylon substrate. Other objects and advantages of the invention will become apparent upon reading the following detailed description.

While the invention will be described and disclosed in connection with certain preferred embodiments and practices, it is in no way intended to limit the invention to those specific embodiments, rather it is intended to cover equivalent structures structural equivalents and all alternative embodiments and modifications as may be defined by the scope of the appended claims and equivalence thereto.

DETAILED DESCRIPTION

As previously indicated, in many airbag applications a coating is desirable to permit the rapid and complete inflation of the restraint cushion during a collision event. This need for a coating is particularly significant with respect to driver side and side impact bags where there is little distance between the occupant and the cushion. Coatings may be particularly important in newly developed curtain type cushion structures wherein prolonged inflation (i.e. for several seconds) may be desired.

The substrate across which the polyamide coatings are applied to form the airbag base fabric in accordance with the present invention is preferably a plain woven fabric formed from yarns comprising polyamide or polyester fibers. Such yarn preferably has a linear density of about 210 denier to about 630 denier. Such yarns are preferably formed from multiple filaments wherein the filaments have linear densities of about 6 denier per filaments or less and most preferably about 4 denier per filament or less. Such substrate fabrics are preferably woven using fluid jet weaving machines as disclosed in U.S. Pat. Nos. 5,503,197 and 5,421,378 to Bower et al. (incorporated herein by reference). The fabric substrate with applied coating will hereinafter be referred to as an airbag base fabric.

In accordance with the potentially preferred practice of the present invention, a water borne microdispersion of finely divided polyamide resin particles is compounded with a thickener and a flame retardant to yield compounded mix having a viscosity of about 8000 centipoise or greater. The potentially preferred polyamide dispersion is marketed under the trade designation MICROMID 632 hpl by Union Camp Corporation which is believed to have a place of business in Wayne, N.J. A potentially preferred thickener is marketed under the trade designation NATROSOL 250 HHXR by the Aqualon division of Hercules Corporation which is believed to have a place of business at Wilmington, Del.

In order to meet Federal Motor Vehicle Safety Standard 302 flame retardant requirements for the automotive industry, a flame retardant is also preferably added to the compounded mix. One potentially preferred flame retardant is AMSPERSE F/R 51 marketed by Amspec Chemical Corporation which is believed to have a place of business at Gloucester City N.J.

Once compounding is complete, the formulation is preferably knife coated across the fabric substrate and either dried or cured to form a thin coating. As will be understood, simple drying is utilized if the polyamide resin is of a thermoplastic character while curing will be utilized if such resin is of a thermosetting character. The final dry weight of the coating is preferably about 0.4 ounces per square yard or less and most preferably 0.2–0.3 ounces per square yard or less. The resultant base fabric is substantially impermeable to air when measured at a differential pressure of 0.5 inches of water according to industry standards.

As previously indicated, the substrate fabric is preferably a woven nylon material. In the most preferred embodiment such substrate fabric will be formed from fibers of nylon 6,6. It has been found that such polyamide materials exhibit particularly good adhesion and maintenance of resistance to hydrolysis when used in combination with the coating according to the present invention.

In order to further describe the present invention the following nonlimiting example is set forth. This example is provided for the sole purpose of illustrating a preferred embodiment of the invention and is not to be construed as limiting the scope of the invention in any manner.

EXAMPLE

A mix was prepared using the following constituents wherein all parts are by weight.

| | |
|---|---|
| MICROMID 632 hpl (35% Solids) | 120 parts |
| NATROSOL 250 HHXR | 2.5 Parts |
| AMSPERSE F/R 51 (70% solids) | 15 parts |
| Water | 40 Parts |

The viscosity of the resultant mix was about 15,000 centipoise. This mix was coated on to a 420 denier Nylon 6,6 airbag fabric substrate using a knife-over-gap coater and dried at 350° F. for 3 minutes. The dry coating weight was 0.25 ounces per square yard. Air permeability measured at 0.5 inches of water is zero cfm per square foot of fabric

What is claimed is:

1. A coated base fabric for an airbag comprising a polyester or polyamide substrate fabric coated with a porosity blocking layer of polyamide material wherein said polyamide material is present on a dry basis at a level of not greater than about 0.6 ounces per square yard and wherein said polyamide material forms an effective barrier to air flow such that said coated base fabric is substantially impermeable to air flow when subjected to a differential pressure of 0.5 inches of water across said coated base fabric.

2. The invention as in claim 1, wherein said polyamide substrate fabric is formed from nylon 6,6 fiber.

3. The invention as in claim 1, wherein said substrate fabric is woven from multifilament yarn characterized by a linear density of about 210–630 denier.

4. The invention as in claim 3, wherein said multifilament yarn is characterized by a filament linear density of about 4 denier per filament or less.

5. The invention as in claim 1, wherein said layer of polyamide material is present on a dry basis at a level of not greater than about 0.4 ounces per square yard.

6. The invention as in claim 5, wherein said polyamide substrate fabric is formed from nylon 6,6 fiber.

7. The invention as in claim 5, wherein said substrate fabric is woven from multifilament yarn characterized by a linear density of about 210–630 denier.

8. The invention as in claim 7, wherein said multifilament yarn is characterized by a filament linear density of about 4 denier per filament or less.

* * * * *